United States Patent Office 3,699,048
Patented Oct. 17, 1972

3,699,048
PROCESS OF PREVENTING SCALE AND DEPOSIT FORMATION IN AQUEOUS SYSTEMS AND PRODUCT
Friedrich Krueger, Edingen, and Lieselotte Bauer, Bad Duerkheim, Germany, assignors to Joh. A. Benckiser GmbH Chemische Fabrik, Ludwigshafen am Rhine, Germany
No Drawing. Filed July 21, 1970, Ser. No. 56,982
Claims priority, application Germany, July 24, 1969, P 19 37 575.8
Int. Cl. C02b 5/06; C23f 14/02
U.S. Cl. 252—180                                                    35 Claims

ABSTRACT OF THE DISCLOSURE

Formation of scale and incrustation in aqueous systems is prevented by the addition of a mixture composed of (a) an amino alkylene phosphonic acid and of
(b) an acrylic or methacrylic acid polymer or a copolymer of acrylic acid and methacrylic acid, or a copolymer of acrylic acid and/or methacrylic acid with a polymerizable, ethylenically unsaturated compound, or a graft polymer of a polysaccharide and especially of starch, dextrin, and modified starch with said acrylic and/or methacrylic acid polymers and copolymers, preferably in substoichiometric amounts calculated for the scale and hardness causing compounds present in the aqueous system.

BACKGROUND OF THE INVENTION

(1) Field of the invention

The present invention relates to an improved process of preventing scale and deposit formation in aqueous systems and more particularly to a process of preventing such scale and deposit formation by means of amino alkylene phosphonic acids and synthetic polymers of the acrylic acid and methacrylic acid type which are added in small amounts to the aqueous system, and to compositions useful in such a process.

(2) Description of the prior art

Polyphosphates are used extensively for preventing scale and deposit formation in aqueous systems. The polyphosphates are added mainly for the reason that they are effective in substoichiometric, so-called threshold amounts and that they are relatively inexpensive. It is, however, known that the polyphosphates are hydrolyzed in aqueous solutions under certain conditions. Thus the amounts of polyphosphates to be added are sometimes quite high and their effectiveness is frequently not fully satisfactory.

Recently amino alkylene phosphonic acids have become of ever increasing importance for use as complex forming, sequestering compounds because they are stable in aqueous solution for an almost indefinite period of time and prevent scale and deposit formation in substoichiometric amounts. They are added to aqueous systems mainly on account of their stability to hydrolysis. For this reason they are admixed, for instance, to cleaning and rinsing solutions in which they are stable for a prolonged period of time even under the most varied conditions of use and storage. The phosphonic acids, however, have the disadvantage that, in contrast to the polyphosphates, they are relatively expensive due to the costly starting materials used in their manufacture.

Furthermore, it is known that certain polyacrylic acid compounds are capable to prevent partly or even completely precipitation of scale forming deposits. However, in order to keep the compounds causing hardness of water completely in solution for a prolonged period of time, such large amounts of the acrylic acid polymers have to be added that their addition is uneconomical.

SUMMARY OF THE INVENTION

It is one object of the present invention to provide a simple and effective process of preventing scale and deposit formation in aqueous systems which process is substantially free of the disadvantages of the known processes and can be carried out in an economical manner.

Another object of the present invention is to provide a composition to be added to aqueous systems to prevent scale and deposit formation in aqueous systems.

A further object of the present invention is to provide improved cleaning and rinsing fluids which are stable and do not form scale and deposits on use for cleaning and rinsing any type of container and the like.

Other objects of the present invention and advantageous features thereof will become apparent as the description proceeds.

In principle the process according to the present invention consists in adding to aqueous systems such as acid or alkaline cleaning and rinsing fluids used, for instance, in automatic bottle rinsing machines, for cleaning milk cans, tanks, and other containers, a mixture of (a) an amino alkylene phosphonic acid and
(b) a polymer of acrylic acid or methacrylic acid or copolymers of such acids with each other or with other polymerizable ethylenically unsaturated compounds.

Such combinations produce a highly advantageous synergistic, scale and deposit formation preventing effect which far exceeds the effect caused by its components when each is added alone to the aqueous system. Preferably the amino alkylene phosphonic acid, on the one hand, and the acrylic acid and/or methacrylic acid polymer or copolymer, on the other hand, are added in a proportion, by weight, of about 1:1 to about 1:50 and most effectively in a proportion of about 1:4 to about 1:20. The amounts of such combination compositions added to the aqueous systems are substoichiometric amounts, calculated for the amount of hardness causing and scale forming compounds present in the aqueous system.

The concentration in which the two active agents according to the present invention are added to the aqueous system may amount to 500 mg./l. of water and is preferably between 10 mg./l. and 30 mg./l. of water.

The amino alkylene phosphonic acids used according to the present invention correspond to Formula I:

$$\begin{array}{c} R_1 \\ \phantom{R_1}\diagdown \\ \phantom{R_1R_1}N-CH_2-P{=}O \\ \phantom{R_1}\diagup \phantom{R_1R_1R_1}\diagdown \\ R_2 \phantom{R_1R_1R_1R_1}OH \end{array} \quad \begin{array}{c} OH \\ \diagup \\ \phantom{aa} \\ OH \end{array} \qquad (I)$$

In said formula $R_1$ represents the group of the formula $$-CH_2-P{\overset{\displaystyle OH}{\underset{\displaystyle OH}{{=}O}}}$$

and $R_2$ represents either (a) the group of the formula $$-CH_2-P{\overset{\displaystyle OH}{\underset{\displaystyle OH}{{=}O}}}$$

or (b) the group of the formula

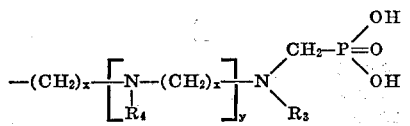

wherein $R_3$ and $R_4$ (1) both represent the group of the formula

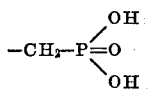

or (2) one of $R_3$ and $R_4$ is hydrogen and the other one is the group of the formula

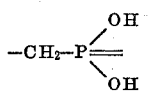

or (3) both are hydrogen; while $x$ is one of the numerals 2 and 3 and $y$ is one of the numerals from 0 to 4; or (c) the group of the formula

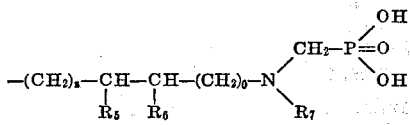

wherein $R_5$ is hydrogen or hydroxyl and $R_6$ is hydrogen or alkyl, preferably lower alkyl, such as methyl, and $R_5$ and $R_6$ together with the two carbon atoms to which they are attached, form a cycloalkyl ring, preferably with four, five, or six carbon atoms, such as cyclobutyl, cyclopentyl, or cyclohexyl; while $o$ and $z$ are one of the numerals 0 and 1 and $R_7$ is hydrogen or the group of the formula

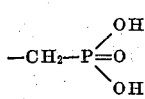

(d) the group of the formula

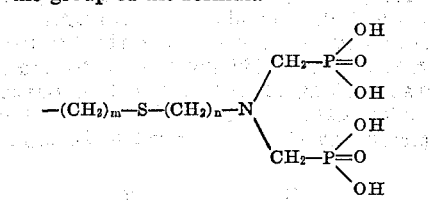

wherein $m$ and $n$ are the numerals 1 to 3.

Examples of amino alkylene phosphonic acids which have proved to be useful in the process according to the present invention are, for instance, amino tris-(methylene phosphonic acid);
diethylene triamino penta-(methylene phosphonic acid);
1,2- and 1,3-propylene diamino tetra-(methylene phosphonic acid);
ethylene diamino tetra-(methylene phosphonic acid);
dipropylene triamino penta-(methylene phosphonic acid);
1,3-diamino-2-propanol tetra-(methylene phosphonic acid);
1,2-bis-(amino methyl) cyclobutane tetra-(methylene phosphonic acid);
1,2-cyclohexane diamino tetra-(methylene phosphonic acid);
1-amino methyl cyclopentyl amino-(2)-tetra(methylene phosphonic acid);
diamino diethyl sulfido tetra-(methylene phosphonic acid);

and others.

Polymers which have proved to be suitable additives to aqueous systems in combination with said amino alkylene phosphonic acids for preventing scale and deposit formation are, for instance, polymerization products obtained by polymerization of acrylic acid or methacrylic acid, preferably of a molecular weight of at least 500;
copolymerization products of acrylic acid and methacrylic acid;
polymers obtained by copolymerization of acrylic acid and/or methacrylic acid with other polymerizable ethylenically unsaturated monomers such as crotonic acid, maleic acid or its anhydride, vinyl sulfonic acid, vinyl phosphonic acid, vinyl acetate, ethyl vinyl ether, acrylamide, ethyl acrylate, ethyl methacrylate, methacrylonitrile, and others.

The preferred polymerization products are those which are water soluble or at least readily dispersible in water. Most effective copolymerization products of the above mentioned polymers are the graft polymers obtained by polymerization of acrylic acid and/or methacrylic acid, if desired, together with other copolymerizable ethylenically unsaturated monomers as mentioned hereinabove, in the presence of a polysaccharide.

Preferred polysaccharides are preformed water soluble polysaccharides and their derivatives, such as starches, for instance, potato starch, corn starch, and other starches, starch ethers, water soluble cellulose ethers, modified starches obtained by treating starch with acids or with oxidizing agents at a temperature below the gelatinization temperature, or starch degradation products which are soluble in cold water and are obtained by treating an aqueous starch suspension with an oxidizing agent at a temperature up to 100° C., or dextrins produced, for instance, by treating starch with acids followed by heating to a temperature above 150° C. or by roasting starch at 180–200° C.

Graft polymerization of acrylic acid, methacrylic acid and, if desired, other polymerizable ethylenically unsaturated monomers in the presence of said polysaccharides is preferably effected by heating in a water bath in 5% to 30% aqueous solution at 40° C. to 100° C. in the presence of a catalyst such as ammonium peroxydisulfate, mixtures of ammonium peroxydisulfate $(NH_4)_2S_2O_8$ and sodium pyrosulfite $Na_2S_2O_5$, or hydrogen peroxide.

As stated above, the combinations of amino alkylene phosphonic acids and acrylic acid and/or methacrylic acid polymers, copolymers, and graft polymers with polysaccharides according to the present invention are added to cleaning compositions as they are known to the art and especially to acid or alkaline cleaning and rinsing fluids. Of particular advantage is the addition of such compositions to cleaning and rinsing fluids used in automatically operating bottle cleaning and rinsing machines or in cleaning tanks and other types of containers. In such cleaning operations scale and deposit formation takes place especially at the stage when the bottles, tanks, or containers are rinsed with fresh water, i.e. at that stage of the cleaning and rinsing process when only traces of the cleaning agent diluted with large amounts of rinsing water are present and are removed by rinsing. Such scale formation is prevented by the presence of small (seeding or threshold) amounts of the hardness stabilizing combination according to the present invention in the strongly diluted rinsing water. If necessary, small amounts of the combination according to the present invention may be added to the rinsing fluids for application to those zones of the aqueous systems which are especially exposed to scale and deposit formation.

DESCRIPTION OF THE PREFERRED EMBODIMENTS

The synergistic effect of the combination of amino alkylene phosphonic acids with acrylic acid or methacrylic acid polymers and copolymers and especially with graft polymerization products of acrylic acid and/or methacrylic acid and, if desired, other polymerizable ethylenically unsaturated compounds with polysaccharides is demonstrated by means of the tests given in the following tables. The threshold value, i.e. the scale and deposit formation preventing effect of the combinations is shown in said tables in comparison with the threshold value of the components tested alone and not in combination with each other.

The threshold value was determined by adding to and dissolving in one liter of water of about 15° (German degrees of hardness) placed in a glass beaker a predetermined amount, in mg., of the compound or, respectively, the mixture of compounds to be tested. The beaker was covered with a watch glass and was allowed to stand at room temperature or, respectively, at 40° C. It was then observed and noted after how many days a glass rod placed into the beaker and/or the walls of the beaker showed formation and deposition of crystals thereon. 0 in the following tables indicates that no crystals are deposited on the glass rod and/or the wall of the breaker — indicates deposit formation.

TABLE I.—THRESHOLD EFFECT OF AMINO ALKYLENE PHOSPHONIC ACIDS (COMPONENT A)

| Test No. | Component A | Amount added in mg. | Crystals deposited after x days— | | | |
|---|---|---|---|---|---|---|
| | | | 2 | 4 | 6 | 8 |
| 1 | Amino tris-(methylene phosphonic acid). | 2.5 | — | — | — | — |
| 2 | Diethylene triamino penta-methylene phosphonic acid). | 1.25 | — | — | — | — |
| 3 | Ethylene diamino tetra(methylene phosphonic acid). | 2.5 | 0 | 0 | — | — |
| 4 | Cyclohexane diamino tetra-(methylene phosphonic acid). | 2.5 | — | — | — | — |
| 5 | 1,2-propylene diamino tetra-(methylene phosphonic acid). | 2.5 | — | — | — | — |

The following Table II shows the threshold values of acrylic acid and/or methacrylic acid polymers and copolymers when added in the form of 5% to 30% aqueous solution to water of the same hardness.

TABLE II.—THRESHOLD VALUE OF THE ACRYLIC ACID AND/OR METHACRYLIC ACID POLYMERS OR COPOLYMERS (COMPONENT B)

| Test No. | Component B | Amount added in mg. | Crystals deposited after x days— | | | | |
|---|---|---|---|---|---|---|---|
| | | | 2 | 4 | 6 | 8 | 10 |
| 6 | Polyacrylic acid | 12.5 | — | — | — | — | — |
| 7 | Copolymer of acrylic acid and vinyl ether in the proportion 2:1. | 12.5 | — | — | — | — | — |
| 8 | Copolymer of acrylic acid and maleic anhydride in the proportion 2:1. | 17.5 | — | — | — | — | — |
| 9 | Copolymer of acrylic acid and vinyl sulfonic acid in the proportion 2:1. | 12.5 | — | — | — | — | — |
| 10 | Copolymer of acrylic acid and vinyl acetate in the proportion 2:1. | 12.5 | 0 | 0 | — | — | — |
| 11 | Copolymer of acrylic acid, vinyl acetate, and maleic anhydride in the proportion 1:1:1. | 12.5 | — | — | — | — | — |
| 12 | Copolymer of acrylic acid and acrylic acid ethyl ester in the proportion 5:1. | 12.5 | — | — | — | — | — |
| 13 | Copolymer of acrylic acid and acrylamide in the proportion 2:1. | 12.5 | — | — | — | — | — |
| | | 25.0 | 0 | — | — | — | — |
| 14 | Copolymer of acrylic acid and acrylamide in the proportion 5:1. | 17.5 | — | — | — | — | — |
| 15 | Copolymer of acrylic acid and acrylamide in the proportion 1:1. | 12.5 | — | — | — | — | — |
| 16 | Copolymer of acrylic acid and acrylamide in the proportion 1:5. | 12.5 | — | — | — | — | — |
| 17 | Polymethacrylic acid | 12.5 | 0 | — | — | — | — |
| 18 | Copolymer of acrylic acid and methacrylic acid in the proportion 5:1. | 12.5 | — | — | — | — | — |
| 19 | Copolymer of acrylic acid and methacrylic acid in the proportion 2:1. | 12.5 | — | — | — | — | — |

The following Table III shows the surprising synergistic effect of the addition of both components A and B to water of the same hardness of 15°.

TABLE III.—THRESHOLD EFFECT OF THE COMBINATION OF COMPONENTS A AND B ACCORDING TO THE PRESENT INVENTION

| Test number | Component A | | Component B | | Proportion A:B | Crystals deposited after x days— | | | | | | | | | |
|---|---|---|---|---|---|---|---|---|---|---|---|---|---|---|---|
| | Amount added in mg. | Compound of test number | Amount added in mg. | Compound of test number | | 2 | 4 | 6 | 8 | 10 | 12 | 14 | 16 | 18 | 20 |
| 20 | 2.5 | 1 | 10 | 6 | 1:4 | 0 | 0 | 0 | 0 | 0 | 0 | 0 | 0 | — | — |
| 21 | 2.5 | 1 | 22.5 | 13 | 1:9 | 0 | 0 | 0 | 0 | 0 | 0 | — | — | — | — |
| 22 | 1.25 | 2 | 11.25 | 6 | 1:9 | 0 | 0 | 0 | 0 | 0 | 0 | 0 | 0 | 0 | 0 |
| 23 | 1.25 | 2 | 22.5 | 6 | 1:18 | 0 | 0 | 0 | 0 | 0 | 0 | 0 | 0 | 0 | 0 |
| 24 | 0.65 | 2 | 11.25 | 6 | 1:18 | 0 | 0 | 0 | 0 | 0 | 0 | 0 | 0 | 0 | 0 |
| 25 | 2.5 | 2 | 15 | 8 | 1:6 | 0 | 0 | 0 | 0 | 0 | 0 | — | — | — | — |
| 26 | 2.5 | 2 | 10 | 9 | 1:4 | 0 | 0 | 0 | 0 | 0 | 0 | 0 | 0 | 0 | — |
| 27 | 2.5 | 2 | 10 | 10 | 1:4 | 0 | 0 | 0 | 0 | 0 | 0 | 0 | 0 | 0 | ¹0 |
| 28 | 2.5 | 2 | 10 | 11 | 1:4 | 0 | 0 | 0 | 0 | 0 | 0 | 0 | 0 | — | — |
| 29 | 2.5 | 2 | 10 | 12 | 1:4 | 0 | 0 | 0 | 0 | 0 | 0 | 0 | — | — | — |
| 30 | 2.5 | 2 | 10 | 13 | 1:4 | 0 | 0 | 0 | 0 | 0 | 0 | — | — | — | — |
| 31 | 2.5 | 2 | 10 | 18 | 1:4 | 0 | 0 | 0 | 0 | 0 | 0 | 0 | 0 | — | — |
| 32 | 2.5 | 3 | 10 | 7 | 1:4 | 0 | 0 | 0 | 0 | 0 | 0 | 0 | 0 | 0 | 0 |
| 33 | 2.5 | 3 | 10 | 9 | 1:4 | 0 | 0 | 0 | 0 | 0 | 0 | 0 | 0 | 0 | 0 |
| 34 | 2.5 | 3 | 10 | 11 | 1:4 | 0 | 0 | 0 | 0 | 0 | 0 | 0 | 0 | — | — |
| 35 | 2.5 | 3 | 10 | 15 | 1:4 | 0 | 0 | 0 | 0 | 0 | 0 | 0 | 0 | — | — |
| 36 | 2.5 | 3 | 10 | 16 | 1:4 | 0 | 0 | 0 | 0 | — | — | — | — | — | — |
| 37 | 2.5 | 4 | 10 | 6 | 1:4 | 0 | 0 | 0 | 0 | 0 | 0 | 0 | 0 | 0 | 0 |
| 38 | 2.5 | 4 | 10 | 10 | 1:4 | 0 | 0 | 0 | 0 | 0 | 0 | 0 | 0 | — | — |
| 39 | 2.5 | 4 | 10 | 17 | 1:4 | 0 | 0 | 0 | 0 | 0 | 0 | — | — | — | — |
| 40 | 1.25 | 4 | 11.25 | 19 | 1:9 | 0 | 0 | 0 | 0 | 0 | 0 | — | — | — | — |
| 41 | 2.5 | 5 | 10 | 6 | 1:4 | 0 | 0 | 0 | 0 | 0 | 0 | 0 | 0 | — | — |
| 42 | 2.5 | 5 | 10 | 9 | 1:4 | 0 | 0 | 0 | 0 | 0 | 0 | 0 | 0 | — | — |
| 43 | 2.5 | 5 | 10 | 10 | 1:4 | 0 | 0 | 0 | 0 | 0 | 0 | — | — | — | — |
| 44 | 2.5 | 5 | 15 | 14 | 1:6 | 0 | 0 | 0 | 0 | 0 | 0 | — | — | — | — |

¹ No crystals deposited even after 28 days.

While the test results given in Tables I to III were observed on allowing the treated water to stand at room temperature, the following Table IV shows the test results observed on standing at 40° C.

TABLE IV.—THRESHOLD EFFECT OF THE COMBINATION OF COMPONENTS A AND B ACCORDING TO THE PRESENT INVENTION AT 40° C.

| Test No. | Components tested | Amounts of— | | Crystals deposited after x days— | | | | |
|---|---|---|---|---|---|---|---|---|
| | | Component A in mg. | Component B in mg. | 2 | 4 | 6 | 8 | 10 |
| 45 | A compound of Test No. 1. | 2.5 | 0 | — | — | — | — | — |
| 46 | B polymer of Test No. 6. | 0 | 12.5 | — | — | — | — | — |
| 47 | A1 plus B6 | 2.5 | 10 | 0 | 0 | 0 | — | — |
| 48 | A compound of Test No. 2. | 2.5 | 0 | — | — | — | — | — |
| 49 | B polymer of Test No. 9. | 0 | 12.5 | — | — | — | — | — |
| 50 | A2 plus B9 | 2.5 | 10 | 0 | 0 | 0 | 0 | 0 |
| 51 | A compound of Test No. 3. | 2.5 | 0 | — | — | — | — | — |
| 52 | A3 plus B6 | 2.5 | 10 | 0 | 0 | 0 | 0 | 0 |

As is evident from these test results, the combinations of amino alkylene phosphonic acids (component A) with acrylic acid and/or methacrylic acid polymers and copolymers (component B) exhibit a scale and deposit formation preventing effect which very considerably surpasses that of the components when added alone. The effectiveness of such combinations is also considerably superior to the additive effect of the components when used alone.

As stated above, especially effective have proved combinations of amino alkylene phosphonic acids with graft polymerization products of acrylic acid and/or methacrylic acid with starches or modified starches.

Such graft polymerization products are preferably prepared according to the following examples without, however, being limited thereto.

The modified starch products and the starch degradation products used as preformed polymers in the following Examples 3 to 5 and 7 of producing graft polymers with acrylic acid and/or methacrylic acid and, if desired, with other polymerizable ethylenically unsaturated monomers are prepared as described in detail in copending application Ser. No. 36,403, filed May 11, 1970, and entitled "Process of Preventing Scale Formation in Aqueous Systems and Product." Said application and the invention described therein are incorporated by reference into the present application.

Example 1

64 g. of potato starch are heated in 900 cc. of water in a boiling water bath for one hour while stirring. A solution of 7.7 g. of ammonium peroxydisulfate in 20 cc. of water is added thereto whereafter 192 g. of acrylic acid are added drop by drop thereto within about 30 minutes. Stirring of the reaction mixture in the boiling water bath is continued for one more hour whereafter the mixture is cooled. The resulting solution is directly added to the aqueous system.

Example 2

25.6 g. of dextrin are suspended in 200 cc. of water. The suspension is heated in a boiling water bath for one hour. After cooling, a solution of 77 g. of acrylic acid in 165 cc. of water is slowly added to the suspension whereafter a solution of 0.04 g. of ammonium peroxydisulfate in 20 cc. of water and a solution of 0.10 g. of sodium metabisulfite in 20 cc. of water are added drop by drop. The reaction mixture is then slowly heated to boiling and heating at said temperature is continued for one more hour while stirring.

Example 3

64 g. of modified starch prepared by treating starch with 2 N hydrochloric acid at a temperature below the gelatinization temperature, i.e. at a temperature of 40° C. to 45° C. for 8 hours, and 192 g. of acrylic acid are graft polymerized by following the procedure in Example 1.

Example 4

64 g. of the starch degradation product obtained by treating an aqueous starch suspension with sodium hypochlorite solution at 100° C., and 192 g. of acrylic acid are graft polymerized by following the procedure described in Example 1.

Example 5

The solution of 42.6 g. of the starch degradation product as used in Example 4, and 7.7 g. of ammonium peroxydisulfate in 900 cc. of water are heated on a boiling water bath. 213 g. of monomeric acrylic acid are added drop by drop thereto within about 30 minutes, while stirring. Heating of the reaction mixture is continued for one more hour whereafter the mixture is cooled.

Example 6

64 g. of corn starch and 192 g. of acrylic acid are graft polymerized as described in Example 1.

Example 7

23.3 g. of a modified starch as used in Example 3 is heated with 900 cc. of water on a boiling water bath. A solution of 7.7 g. of ammonium peroxydisulfate in 20 cc. of water is added thereto. Thereafter, a mixture of 116.5 g. of methacrylic acid and 116.5 g. of acrylic acid are slowly added drop by drop thereto. Heating of the resulting reaction mixture in a boiling water bath is continued for one more hour.

In place of acrylic acid and/or methacrylic acid used as monomers in Examples 1 to 7, there can be used mixtures of said monomers with other polymerizable ethylenically unsaturated monomers as they have been mentioned hereinabove.

The following Tables V to VII demonstrate specifically the synergistic deposit formation preventing effect of a combination of amino alkylene phosphonic acids and graft polymerization products of acrylic acid and/or methacrylic acid with polysaccharides and especially with starch or modified starch or starch degradation products.

To determine the threshold value, a predetermined amount, in mg., of the compound or, respectively, the mixture of compounds to be tested was added to, and dissolved in, one liter of water of about 17° (German degree of hardness) to which 12 g. of sodium hydroxide were added. The mixture was kept at room temperature in a glass beaker covered with a watch glass. It was observed and noted after how many days a glass rod placed into the beaker and/or the walls of the beaker showed scale formation and deposition of crystals. The graft polymer was added in 5% to 30% aqueous solution, depending on its solubility. As in Tables I to IV: 0 indicates that no deposit is formed on the glass rod or on the beaker wall, while — indicates formation of crystals.

TABLE V.—THRESHOLD EFFECT OF AMINO ALKYLENE PHOSPHONIC ACID COMPONENT D

| Test No. | Component D | Amount added in mg. | Crystals deposited after x days— | | | | | |
|---|---|---|---|---|---|---|---|---|
| | | | 1 | 2 | 3 | 4 | 5 | 6 |
| 54 | Amino tris-(methylene phosphonic acid). | 2.5 | 0 | 0 | — | — | — | — |
| 55 | Diethylene triamino penta-(methylene phosphonic acid). | 2.5 | 0 | 0 | 0 | — | — | — |
| 56 | Ethylenediamino tetra-(methylene phosphonic acid). | 2.5 | 0 | 0 | — | — | — | — |

TABLE VI.—THRESHOLD EFFECT OF THE GRAFT POLYMERS COMPONENT E

| Test No. | Component E | Amount added in mg. | Crystals deposited after x days— | | | | | |
|---|---|---|---|---|---|---|---|---|
| | | | 1 | 2 | 3 | 4 | 5 | 6 |
| 57 | Graft polymer of potato starch and acrylic acid of Ex. 1. | 12.5 | 0 | 0 | — | — | — | — |
| 58 | Graft polymer of dextrin and acrylic acid of Ex. 2. | 12.5 | 0 | 0 | — | — | — | — |
| 59 | Graft polymer of modified starch and acrylic acid of Ex. 3. | 12.5 | 0 | — | — | — | — | — |
| 60 | Graft polymer of a starch degradation product and acrylic acid of Ex. 4. | 12.5 | 0 | 0 | 0 | — | — | — |
| 61 | Graft polymer of a starch degradation product and acrylic acid of Ex. 5. | 12.5 | 0 | — | — | — | — | — |
| 62 | Graft polymer of corn starch and acrylic acid of Ex. 6. | 12.5 | 0 | — | — | — | — | — |
| 63 | Graft polymer of modified starch and a mixture of acrylic acid and methacrylic acid of Ex. 7. | 12.5 | 0 | 0 | — | — | — | — |

These test results of Tables V to VII also show that the combined use of an amino alkylene phosphonic acid and a graft polymerization product of a polysaccharide and acrylic acid or methacrylic acid or mixtures thereof according to the present invention has a better scale and deposit formation preventing effect than the components when used alone. Said effect is even considerably better than the additive effect of the components.

The tests of Tables I to VII were carried out in an alkaline medium in order to show that the advantageous stabilizing effect of the combination according to this invention is achieved in such a medium as it is required in many cleaning and rinsing operations. The same results are also achieved in water of its own pH-value.

TABLE VII.—THRESHOLD EFFECT OF THE COMBINATION OF COMPONENTS D AND E ACCORDING TO THE PRESENT INVENTION

| Test No. | Component D | | Component E | | Crystals deposited after, days— | | | | | | |
|---|---|---|---|---|---|---|---|---|---|---|---|
| | Amount added in mg. | Compound of Test No. | Amount added in mg. | Compound of Test No. | 2 | 4 | 6 | 8 | 10 | 12 | 14 |
| 64 | 2.5 | 54 | 10 | 57 | 0 | 0 | 0 | 0 | 0 | — | — |
| 65 | 2.5 | 55 | 10 | 57 | 0 | 0 | 0 | 0 | 0 | 0 | 0 |
| 66 | 2.5 | 56 | 10 | 57 | 0 | 0 | 0 | 0 | 0 | 0 | — |
| 67 | 2.0 | 54 | 8.0 | 58 | 0 | 0 | 0 | 0 | — | — | — |
| 68 | 2.5 | 55 | 10 | 58 | 0 | 0 | 0 | 0 | 0 | 0 | 0 |
| 69 | 2.5 | 54 | 10 | 59 | 0 | 0 | 0 | 0 | 0 | — | — |
| 70 | 2.5 | 54 | 10 | 60 | 0 | 0 | 0 | 0 | 0 | 0 | 0 |
| 71 | 2.5 | 56 | 10 | 60 | 0 | 0 | 0 | 0 | 0 | 0 | 0 |
| 72 | 2.5 | 55 | 10 | 61 | 0 | 0 | 0 | 0 | 0 | 0 | — |
| 73 | 2 | 56 | 8 | 61 | 0 | 0 | 0 | 0 | 0 | 0 | — |
| 74 | 1.25 | 56 | 11.25 | 62 | 0 | 0 | 0 | 0 | 0 | 0 | 0 |
| 75 | 2.5 | 55 | 10 | 63 | 0 | 0 | 0 | 0 | 0 | 0 | 0 |

The combinations according to the present invention are added to conventional cleaning compositions and especially to acid or alkaline cleaning and rinsing fluids. Improved cleaning and rinsing fluids according to the present invention are, for instance, of the following composition without, however, being limited thereto.

Example 8

Composition: Percent
Mixture of acid phosphoric acid monomethyl and dimethyl esters _____ 40
Combination of the present invention as used in Test No. 24 (Table III), i.e. a mixture of 1 part of diethylene triamino penta-(methylene phosphonic acid) and 18 parts of the copolymerization product of acrylic acid and vinyl acetate (2:1) _____ 20
Antifoaming agent, i.e. a bulk polymer of ethylene oxide with polypropylene glycol sold under the trademark Pluronic L 61 (Wyandotte) __ 10
Water _____ 30

0.2% of said composition is dissolved in a cleaning fluid consisting of aqueous 1% sodium hydroxide solution. Said cleaning fluid has proved to be highly effective in the cleaning and rinsing of glass bottles.

Example 9

Composition: Percent
Aqueous 67% gluconic acid solution _____ 70
Combination of the present invention as used in Test No. 27 (Table III), i.e. a mixture of 1 part of diethylene triamino penta(methylene phosphonic acid) and 4 parts of the copolymerization product of acrylic acid and vinyl acetate (2:1) _____ 20
Water _____ 10

0.2% of said mixture are dissolved in aqueous 1% sodium hydroxide solution to yield a highly effective bottle rinsing fluid.

Example 10

Composition: Percent
Sodium silicate _____ 35
Combination of the present invention as used in Test No. 32 (Table III), i.e. a mixture of 1 part of ethylene diamino tetra-(methylene phosphonic acid) and the copolymerization product of acrylic acid and vinyl ether (2:1) _____ 3
Sodium carbonate _____ 20
Sodium hydroxide _____ 17
Wetting agent, i.e. the nonyl phenol polyglycol ether with 6 moles of ethylene oxide per mole of nonyl phenol sold under the trademark Arkopal N/O 60 (Hoechst) _____ 5
Sodium sulfate _____ 10
Trisodium orthophosphate _____ 10

1% aqueous solutions of said mixture are advantageously used for cleaning and rinsing milk cans.

Example 11

The composition is the same as given hereinabove in Example 8, whereby, however, the combination is replaced by the combination of Test No. 70 (Table VII), i.e. a mixture of 1 part of amino tris-(methylene phosphonic acid) and 4 parts of the graft polymerization product, obtained according to Example 4 hereinabove, of acrylic acid and a starch degradation product produced by the action of a sodium hypochlorite solution at 100° C. on starch.

0.2% of the resulting composition are dissolved in aqueous 1% sodium hydroxide solution to yield a highly advantageous bottle rinsing solution.

Example 12

The composition is the same as given hereinabove in Example 9, whereby, however, the combination is replaced by the combination of Test No. 74 (Table VII), i.e. a mixture of 1 part of ethylene diamino tetra-(methylene phosphonic acid) and 9 parts of the graft polymerization product of acrylic acid and corn starch obtained according to Example 6 hereinabove.

A 0.2% solution of this composition in aqueous 1% sodium hydroxide solution is useful for rinsing bottles.

Example 13

The composition is the same as given hereinabove in Example 10, whereby, however, the combination is replaced by the combination of Test No. 75 (Table VIII), i.e. a mixture of 1 part of diethylene triamino penta-(methylene phosphonic acid) and 4 parts of the graft polymerization product, obtained according to Example 7, of acrylic acid and methacrylic acid with starch modified by treating starch with 2 N hydrochloric acid below the gelatinization temperature.

1% aqueous solutions of said mixture have proved to be effective cleaning fluids for milk cans.

Example 14

Composition: Percent
Tripolyphosphate _____ 40
Combinathion of the present invention as used in Test No. 44 (Table III), i.e. a mixture of 1 part of 1,2-propylene diamino tetra-(methylene phosphonic acid) and 6 parts of the copolymerization product of acrylic acid and acrylamide (5:1) _____ 10
Antifoaming agent Pluronic L 61 (Wyandotte)__ 5
Trisodium orthophosphate _____ 10
Sodium gluconate _____ 35

0.2% of said mixture are dissolved in aqueous 1.5% sodium hydroxide solution. The resulting solution is a highly effective solution for cleaning bottles and especially bottles with aluminum accessories such as aluminum labels and/or aluminum caps.

It is, of course, understood that any other type of aqueous cleaning and rinsing fluid than those given in the examples can be used and that the effective scale and deposit formation preventing combination according to the present invention can be replaced by any other combination as described hereinbefore and claimed in the annexed claims.

We claim:
1. In a process of preventing scale and deposit formation in aqueous systems by adding to the aqueous system, as scale and deposit formation suppressing agent, a mixture composed of
  (a) an amino alkylene phosphonic acid and of
  (b) a polymer selected from the group consisting of a polymer of acrylic acid, a polymer of methacrylic acid, a copolymer of acrylic acid and methacrylic acid, a copolymer of acrylic acid and/or methacrylic acid with a polymerizable, ethylenically unsaturated compound, a graft polymer of a polysaccharide and said acrylic acid and/or methacrylic acid, and a graft polymer of a polysaccharide and said acrylic acid and/or methacrylic acid and a polymerizable, ethylenically unsaturated compound,
the improvement which consists in adding to the aqueous system a mixture containing the amino alkylene phosphonic acid and the polymer in a proportion, by weight, between about 1:1 and about 1:50, said mixture being added to said aqueous system in a substoichiometric amount sufficient to suppress scale and deposit formation.

2. The process of claim 1, wherein the amino alkylene phosphonic acid and the polymer are present in the mixture in the proportion, by weight, between about 1:4 and about 1:20.

3. The process of claim 1, wherein the scale and deposit formation suppressing agent is added to the aqueous system in an amount not substantially exceeding 500 mg./l. of aqueous system.

4. The process of claim 2, wherein the scale and deposit formation suppressing agent is added to the aqueous system in an amount between about 10 mg./l. and about 30 mg./l. of aqueous system.

5. The process of claim 1, wherein the amino alkylene phosphonic acid is an acid of the formula

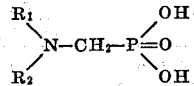

wherein
  $R_1$ is the group of the formula

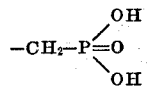

while
  $R_2$ is a member selected from the group consisting of
    (a) the group of the formula

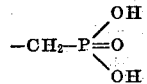

(b) the group of the formula

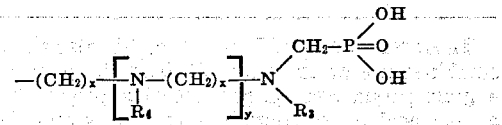

wherein
    $R_3$ and $R_4$ are members selected from the group consisting of hydrogen and the group of the formula

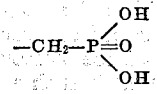

while
    $x$ is one of the numerals 2 and 3 and
    $y$ is one of the numerals from 0 to 4;
    (c) the group of the formula

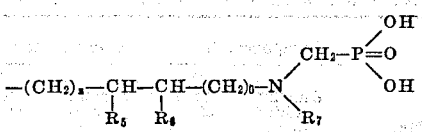

wherein
    $R_5$ is a member selected from the group consisting of hydrogen and hydroxyl;
    $R_6$ is a member selected from the group consisting of hydrogen and a lower alkyl, and $R_5$ and $R_6$ together with the carbon atoms to which they are attached, form a cycloalkyl ring with 4 to 6 carbon atoms;
    $o$ and $z$ are one of the numerals 0 and 1; and
    $R_7$ is a member selected from the group consisting of hydrogen and the group of the formula

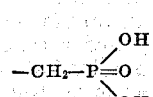

and
    (d) the group of the formula

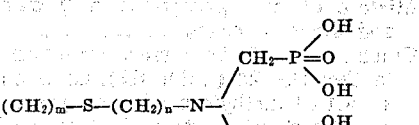

wherein
    $m$ and $n$ are one of the numerals from 1 to 3.

6. The process of claim 1, wherein the amino alkylene phosphonic acid is diethylene triamino penta(methylene phosphonic acid).

7. The process of claim 1, wherein the amino alkylene phosphonic acid is ethylene diamino tetra-(methylene phosphonic acid).

8. The process of claim 1, wherein the amino alkylene phosphonic acid is amino tris-(methylene phosphonic acid).

9. The process of claim 1, wherein the amino alkylene phosphonic acid is cyclohexane diamino tetra-(methylene phosphonic acid).

10. The process of claim 1, wherein the polymer is an acrylic acid polymer.

11. The process of claim 1, wherein the polymer is a copolymer of acrylic acid and vinyl ether in the proportion of about 2:1.

12. The process of claim 1, wherein the polymer is a copolymer of acrylic acid and vinyl sulfonic acid in the proportion of about 2:1.

13. The process of claim 1, wherein the polymer is a copolymer of acrylic acid and vinyl acetate in the proportion of about 2:1.

14. The process of claim 1, wherein the polymer is a graft polymer of starch and acrylic acid.

15. The process of claim 1, wherein the polymer is a graft polymer of dextrin and acrylic acid.

16. The process of claim 1, wherein the polymer is a graft polymer of starch modified by heating with hypochlorite solution, and acrylic acid.

17. The process of claim 1, wherein the polymer is a graft polymer of starch modified by acid treatment below the gelatinization temperature, and a mixture of acrylic acid and methacrylic acid.

18. The process of claim 1, wherein the polysaccharide of the graft polymer is a polysaccharide selected from the group consisting of starch, acid modified starch, starch modified by the action of an oxidizing agent, cold water soluble starch degradation products, cold water soluble dextrins, and mixtures thereof.

19. A composition for suppressing scale and deposit formation in aqueous systems, said composition containing, as scale and deposit formation suppressing agent, a mixture composed of
 (a) an amino alkylene phosphonic acid and of
 (b) a polymer selected from the group consisting of a polymer of acrylic acid, a polymer of methacrylic acid, a copolymer of acrylic acid and methacrylic acid, a copolymer of acrylic acid and/or methacrylic acid with a polymerizable, ethylenically unsaturated compound, a graft polymer of a polysaccharide and said acrylic acid and/or methacrylic acid and a graft polymer of a polysaccharide and said acrylic acid and/or methacrylic acid and a polymerizable, ethylenically unsaturated compound,
the amino alkylene phosphonic acid and the polymer being present in said mixture in the proportion, by weight, between about 1:1 and about 1:50.

20. The composition of claim 19, wherein the amino alkylene phosphonic acid and the polymer are present in the mixture in the proportion, by weight, between about 1:4 and about 1:20.

21. The composition of claim 19, wherein the amino alkylene phosphonic acid is an acid of the formula $$R_1\diagdown\!\!\!\!\!\diagup\!\!\!\!\!N\!\!-\!\!CH_2\!\!-\!\!P\diagdown\!\!\!\!\!\diagup\!\!\!\!\!\overset{OH}{\underset{OH}{=O}}$$

wherein
 $R_1$ is the group of the formula $$-CH_2-P\diagdown\!\!\!\!\!\diagup\!\!\!\!\!\overset{OH}{\underset{OH}{=O}}$$

while
 $R_2$ is a member selected from the group consisting of
 (a) the group of the formula $$-CH_2-P\diagdown\!\!\!\!\!\diagup\!\!\!\!\!\overset{OH}{\underset{OH}{=O}}$$

(b) the group of the formula $$-(CH_2)_x\!\!-\!\!\!\left[\!\!\underset{R_4}{\overset{}{N}}\!\!-\!\!(CH_2)_x\!\!\right]_y\!\!\!-\!\!N\diagdown\!\!\!\!\!\diagup\!\!\!\!\!\overset{CH_2-P\overset{OH}{=O}\overset{}{\underset{OH}{}}}{\underset{R_3}{}}$$

wherein
 $R_3$ and $R_4$ are members selected from the group consisting of hydrogen and the group of the formula $$-CH_2-P\diagdown\!\!\!\!\!\diagup\!\!\!\!\!\overset{OH}{\underset{OH}{=O}}$$

while
 $x$ is one of the numerals 2 and 3; and
 $y$ is one of the numerals from 0 to 4;
 (c) the group of the formula $$-(CH_2)_o\!\!-\!\!\underset{R_5}{\overset{}{CH}}\!\!-\!\!\underset{R_6}{\overset{}{CH}}\!\!-\!\!(CH_2)_z\!\!-\!\!\underset{R_7}{\overset{}{N}}\diagdown\!\!\!\!\!\diagup\!\!\!\!\!\overset{CH_2-P\overset{OH}{=O}\overset{}{\underset{OH}{}}}{}$$

wherein
 $R_5$ is a member selected from the group consisting of hydrogen and hydroxyl;
 $R_6$ is a member selected from the group consisting of hydrogen and lower alkyl, and $R_5$ and $R_6$ together with the carbon atoms to which they are attached, form a cycloalkyl ring with 4 to 6 carbon atoms;
 $o$ and $z$ are one of the numerals 0 and 1; and
 $R_7$ is a member selected from the group consisting of hydrogen and the group of the formula $$-CH_2-P\diagdown\!\!\!\!\!\diagup\!\!\!\!\!\overset{OH}{\underset{OH}{=O}}$$

and
 (d) the group of the formula $$-(CH_2)_m\!\!-\!\!S\!\!-\!\!(CH_2)_n\!\!-\!\!N\diagdown\!\!\!\!\!\diagup\!\!\!\!\!\overset{CH_2-P\overset{OH}{=O}\overset{}{\underset{OH}{}}}{\underset{CH_2-P\overset{OH}{=O}\overset{}{\underset{OH}{}}}{}}$$

wherein
 $m$ and $n$ are one of the numerals from 1 to 3.

22. The composition of claim 19, wherein the amino alkylene phosphonic acid is diethylene triamino penta-(methylene phosphonic acid).

23. The composition of claim 19, wherein the amino alkylene phosphonic acid is ethylene diamino tetra-(methylene phosphonic acid).

24. The composition of claim 19, wherein the amino alkylene phosphonic acid is amino tris-(methylene phosphonic acid).

25. The composition of claim 19, wherein the polymer is an acrylic acid polymer.

26. The composition of claim 19, wherein the polymer is a copolymer of an acrylic acid compound selected from the group consisting of acrylic acid, methacrylic acid, and mixtures thereof, with a polymerizable ethylenically unsaturated compound.

27. The composition of claim 19, wherein the polymer is a graft polymer of starch and acrylic acid.

28. The composition of claim 19, wherein the polysaccharide of the graft polymer is a polysaccharide selected from the group consisting of starch, acid modified starch, starch modified by the action of an oxidizing agent, cold water soluble starch degradation products, cold water soluble dextrins, and mixtures thereof.

29. A cleaning fluid comprising an aqueous cleaning solution containing, as scale and deposit formation suppressing agent, the composition of claim 19 in an amount between about 10 mg./l. and about 500 mg./l. of cleaning fluid.

30. The cleaning fluid of claim 29, wherein the scale and deposit formation suppressing agent is the composition of claim 20.

31. The cleaning fluid of claim 29, wherein the scale and deposit formation suppressing agent is the composition of claim 21.

32. The cleaning fluid of claim 29, wherein the aqueous cleaning solution is an aqueous about 1% sodium hydroxide solution.

33. The cleaning fluid of claim 29, wherein the aqueous cleaning solution is an aqueous solution of a cleaning agent selected from the group consisting of an acid phosphoric acid lower alkyl ester, gluconic acid, and trisodium orthophosphate.

34. The cleaning fluid of claim 33, wherein the aqueous solution is a dilute aqueous sodium hydroxide solution.

35. The cleaning fluid of claim 29 containing additionally sodium silicate as corrosion preventing agent.

References Cited

UNITED STATES PATENTS

| | | | |
|---|---|---|---|
| 3,505,238 | 4/1970 | Liddell | 252—180 |
| 3,234,124 | 2/1966 | Irani | 252—175 X |
| 3,293,152 | 12/1966 | Herbert | 252—180 X |
| 2,718,497 | 9/1955 | Oldham | 252—8.5 |
| 2,783,200 | 2/1957 | Crum | 252—181 X |
| 3,085,916 | 4/1963 | Zimmie | 134—22 |
| 3,331,773 | 7/1967 | Gunderson | 252—180 X |
| 3,336,221 | 8/1967 | Ralston | 252—180 X |
| 3,418,237 | 12/1968 | Booth | 210—54 |
| 3,527,608 | 9/1970 | Schlüssler | 252—156 X |
| 3,541,009 | 11/1970 | Arendt | 252—180 X |

ROBERT F. BURNETT, Primary Examiner

M. E. McCAMISH, Assistant Examiner

U.S. Cl. X.R.

21—2.7; 134—2, 22, 41; 210—54, 58, 59

UNITED STATES PATENT OFFICE
CERTIFICATE OF CORRECTION

Patent No. 3,699,048  Dated October 17, 1972

Inventor(s) FRIEDRICH KRUEGER and LIESELOTTE BAUER

It is certified that error appears in the above-identified patent and that said Letters Patent are hereby corrected as shown below:

Column 3, line 20: The formula should read as follows:

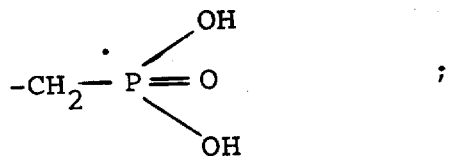

Column 3, line 74: "tetra(methylene" should read -- tetra-(methylene -- ;

Column 5, line 40: "tetra(methyl-" should read -- tetra-(methyl- --;

Column 11, line 3: "A" should read -- An --;

Column 11, line 22: "Combinathion" should read -- Combination -- ;

Column 13, line 2: "penta(methylene" should read -- penta-(methylene --;

Column 14, line 12: "$-(CH_3)_x-$" should read -- $-(CH_2)_x-$ --.

Signed and sealed this 13th day of March 1973.

(SEAL)
Attest:

EDWARD M. FLETCHER, JR.
Attesting Officer

ROBERT GOTTSCHALK
Commissioner of Patents